United States Patent
Le

(10) Patent No.: US 10,320,715 B1
(45) Date of Patent: Jun. 11, 2019

(54) AUTOMATED SCALING OF COMPUTING MESSAGE ARCHITECTURE

(71) Applicant: Sprint Communications Company L.P., Overland Park, KS (US)

(72) Inventor: Hoa Le, Kansas City, MO (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 15/799,651

(22) Filed: Oct. 31, 2017

(51) Int. Cl.
  *H04L 12/861* (2013.01)
  *H04W 4/12* (2009.01)

(52) U.S. Cl.
  CPC .......... *H04L 49/90* (2013.01); *H04W 4/12* (2013.01)

(58) Field of Classification Search
  None
  See application file for complete search history.

(56) References Cited

U.S. PATENT DOCUMENTS

| | | | |
|---|---|---|---|
| 2012/0198004 A1* | 8/2012 | Watte | H04L 51/043 709/206 |
| 2013/0318178 A1* | 11/2013 | Addante | G06Q 10/107 709/206 |
| 2015/0264152 A1* | 9/2015 | Vlachogiannis | H04L 67/10 709/213 |
| 2016/0212633 A1* | 7/2016 | Flanagan | H04W 24/02 |
| 2016/0219089 A1* | 7/2016 | Murthy | H04L 65/4076 |
| 2016/0261727 A1* | 9/2016 | Yang | H04L 65/4084 |

* cited by examiner

*Primary Examiner* — Sargon N Nano
*Assistant Examiner* — Christopher B Robinson

(57) ABSTRACT

A method of processing data message in a computer system comprising a plurality of message queueing nodes, message processing nodes, and coordinating nodes. The method comprises notifying a coordinating agent executing on a coordinating node of addition or removal of a message queueing node or a message processing node, updating a coordinating configuration file by the agent where message queueing agents and message processing agents listen for changes to the coordinating configuration file, changing message queue configuration files by message queueing agents, changing message processing configuration files by message processing agents, restarting a message queueing service on each of the message queueing nodes by the coordinating agent, and restarting a message processing service on each of the message processing nodes by the coordinating agent.

14 Claims, 8 Drawing Sheets

AUTOMATED SCALING OF COMPUTING MESSAGE ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems may generate large flows of data. Different computers within the computer system may be used to implement architectural layers of a composite data flow, where the data may flow from a data source to a first layer, from the first layer to a second layer, from the second layer to other layers and ultimately to a final layer. Some of the layers may provide a message queueing function to decouple a lower layer from a higher layer, so the two layers need not synchronize to coordinate the flow of data. For example, a lower layer may push a message to the message queue, where the message comprises some data or information to be processed by a higher layer. The higher layer retrieves the message from the message queue when it is ready to process it. If the message queue is empty, the higher layer waits until another message is available. In this way the lower layer does not have to handshake with the higher layer to pass messages.

SUMMARY

In an embodiment, a method of processing data messages in a computing system is disclosed. The method comprises receiving messages by a plurality of message queueing nodes of the computing system and storing the messages in message queues provided by the message queueing nodes, where each of the message queueing nodes executes a message queueing service and a message queueing agent. The method further comprises retrieving messages from the message queues by a plurality of message processing nodes of the computing system, processing the retrieved messages, and delivering these processed messages, where each of the message processing nodes execute a message processing service and a message processing agent. The method further comprises adding a message queueing node to the computing system. The method further comprises sending a message from a message queueing agent executing on the added message queueing node to a coordinating agent executing on a coordinating node of the computing system, where the message comprises an IP address of the added message queueing node and a node identity number of the added message queueing node. The method further comprises updating a coordinating configuration file with the IP address and the node identity number of the added message queueing node by the coordinating agent, where the configuration file is maintained by the coordinating node and the message queueing agents and the message processing agents are registered to listen to changes to the coordinating configuration file, and notifying message queueing agents and message processing agents of the update to the coordinating configuration file. The method further comprises updating by each message queueing agent a message queueing configuration file associated with its associated message queueing node with the IP address and the node identity number of the added message queueing node and updating by each message processing agent a message processing configuration file associated with its associated message processing node with the IP address and the node identity number of the added message queueing node. The method further comprises monitoring updates to message queueing configuration files and message processing configuration files by the coordinating agent, in response to determining that message queueing configuration files have been updated, restarting the message queueing service on the associated message queueing nodes by the coordinating agent, and in response to determining that message processing configuration files have been updated, restarting the message processing service on the associated message processing nodes by the coordinating agent.

In another embodiment, a method of processing data messages in a computing system is disclosed. The method comprises receiving messages by a plurality of message queueing nodes of the computing system and storing the messages in message queues provided by the message queueing nodes, where each of the message queueing nodes executes a message queueing service and a message queueing agent. The method further comprises retrieving messages from the message queues by a plurality of message processing nodes of the computing system, processing the retrieved messages, and delivering these processed messages, where each of the message processing nodes execute a message processing service and a message processing agent. The method further comprises adding a message processing node to the computing system and sending a message from a message processing agent executing on the added message processing node to a coordinating agent executing on a coordinating node of the computing system, where the message comprises an IP address of the added message processing node and a node identity number of the added message processing node. The method further comprises updating a coordinating configuration file with the IP address and the node identity number of the added message processing node by the coordinating agent, where the configuration file is maintained by the coordinating node and the message queueing agents and the message processing agents are registered to listen to changes to the coordinating configuration file. The method further comprises notifying message queueing agents and message processing agents of the update to the coordinating configuration file and updating by each message queueing agent a message queueing configuration file associated with its associated message queueing node with the IP address and the node identity number of the added message processing node. The method further comprises updating by each message processing agent a message processing configuration file associated with its associated message processing node with the IP address and the node identity number of the added message processing node. The method further comprises monitoring updates to message queueing configuration files and message processing configuration files by the coordinating agent, in response to determining that message queueing configuration files have been updated, restarting the message queueing service on the associated message queueing nodes by the coordinating agent, and in response to determining that message processing configuration files have been updated, restarting the message processing service on the associated message processing nodes by the coordinating agent.

In yet another embodiment, a method of processing data messages in a computing system is disclosed. The method comprises receiving messages by a plurality of message queueing nodes of the computing system and storing the messages in message queues provided by the message queueing nodes, where each of the message queueing nodes executes a message queueing service and a message queueing agent. The method further comprises retrieving messages from the message queues by a plurality of message processing nodes of the computing system, processing the retrieved messages, and delivering these processed messages, where each of the message processing nodes execute a message processing service and a message processing agent. The method further comprises removing a message queueing node or a message processing node from the computing system and updating a coordinating configuration file by removing the IP address and the node identity number of the removed node by the coordinating agent, where the configuration file is maintained by the coordinating node and the message queueing agents and the message processing agents are registered to listen to changes to the coordinating configuration file. The method further comprises notifying message queueing agents and message processing agents of the update to the coordinating configuration file and updating by each message queueing agent a message queueing configuration file associated with its associated message queueing node by removing the IP address and the node identity number of the removed node from the message queueing configuration file. The method further comprises updating by each message processing agent a message processing configuration file associated with its associated message processing node by removing the IP address and the node identity number of the removed node from the message processing configuration file and monitoring updates to message queueing configuration files and message processing configuration files by the coordinating agent. The method further comprises, in response to determining that message queueing configuration files have been updated, restarting the message queueing service on the associated message queueing nodes by the coordinating agent, and in response to determining that message processing configuration files have been updated, restarting the message processing service on the associated message processing nodes by the coordinating agent.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
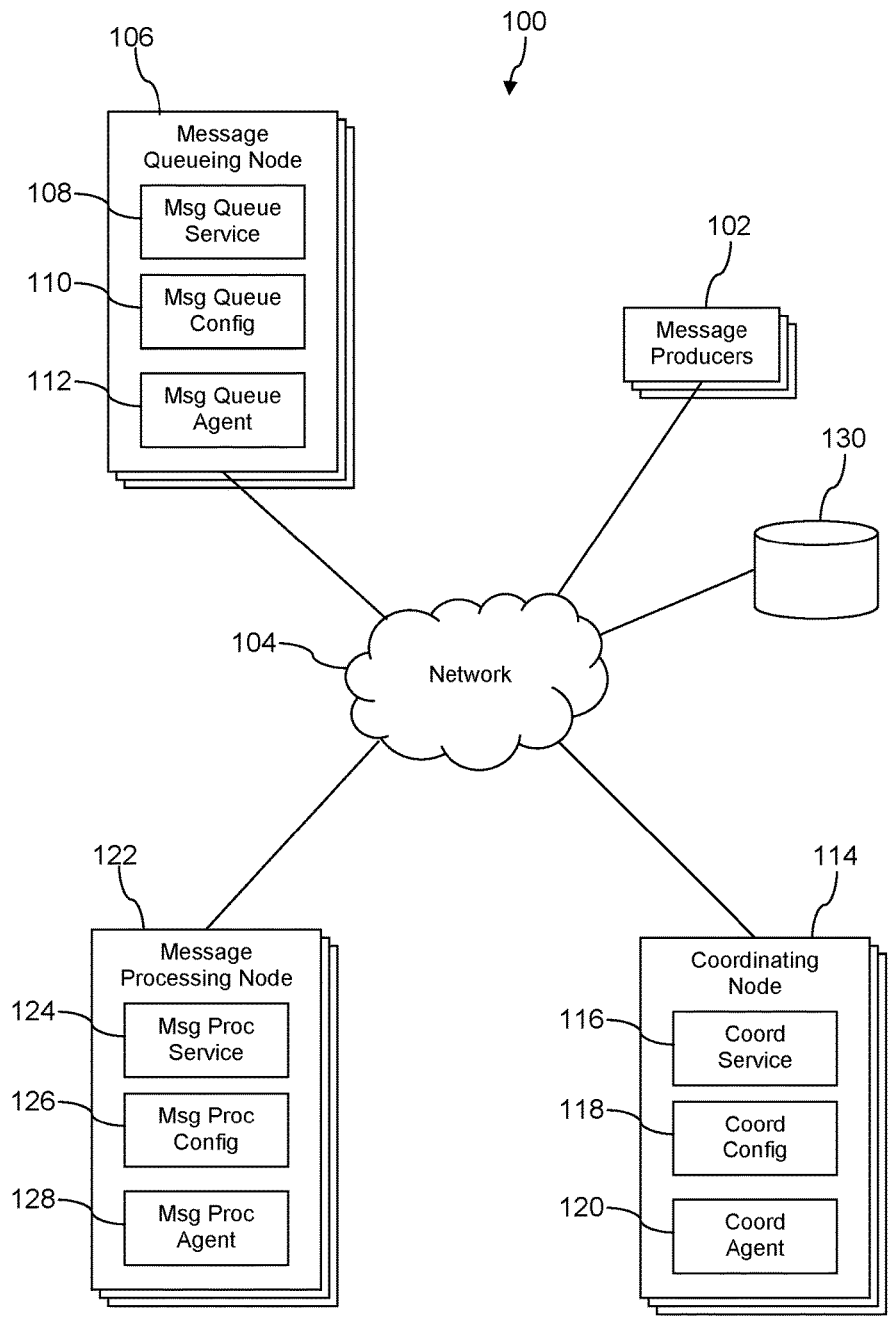
FIG. 1 is an illustration of communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a tiered messaging system that automatically adapts configuration files and restarts services on reconfigured computing nodes as computing nodes are added to the messaging system or removed from the messaging system. The system may receive a heavy stream of data messages from a plurality of producer processes not formally considered part of the system. A message queueing layer receives and queues these messages. A message processing layer, mediated by a coordinating layer, retrieves messages from the message queueing layer and processes these messages before storing them in one or more data stores which are not formally considered part of the system. The producers may be forwarding event messages associated with a large number of mobile communication devices, for example tens of millions of mobile communication devices. The processed messages may be processed by dropping some messages, aggregating other messages, and creating reports that summarize a plurality of other messages. The message queueing layer, the coordinating layer, and the message processing layer each comprise a plurality of computing nodes, and the number of these computing nodes may be increased or decreased as message streaming loads increase or decrease. In an embodiment, the computing nodes are provided by a cloud computing system, and the message queueing, coordinating, and message processing functionality is provided by services running on virtual machines provided on the computing nodes.

When a computing node is added or removed from the tiered messaging system, configuration files associated with each of the other computing nodes in the tiered messaging system desirably are updated with the change and the associated service supported by that computing node restarted. For example, an IP address and node identity number of the added computing node is added to the configuration files or the IP address and node identity number of the removed computing node is removed from the configuration files and then the services on the remaining computing nodes are restarted. During the restart of the services, the initiation sequence of each service takes notice of its changed configuration file of the node on which it executes and adapts its interactions with the other nodes accordingly.

In the past this modification of computing nodes and restarting of services was handled manually by human system administrators or technicians. In an example system, there may be about 25 computing nodes running in the message queueing layer, 5 computing nodes running in the mediation layer, and 20 computing nodes running in the message processing layer. The number of computing nodes may diurnally cycle through an increase of computing capacity by adding nodes and a decrease of computing capacity by removing nodes, as the activity of mobile communication devices diurnally cycles through a peak of activity and a minimum of activity. This manual process consumed the time of technicians undesirably and further impeded the responsiveness of the layered messaging system. The present disclosure teaches automatically adapting the configuration files and restarting services without the continued involvement of the technician other than to initially trigger the update, for example by adding a new computing node or by removing an existing computing node and notifying a coordinating agent executing in the coordination layer. This automatic adaptation increases the computing efficiency of the system and improves the throughput of the event handling network, because it can respond more promptly than a human operator can to changing loads. Additionally, this automatic adaptation can be more readily modified and the modification uniformly propagated across the system, for example as computing cycles are analyzed in greater depth by the system.

When a message queueing computing node is added to the system, a message is sent automatically from a message queueing agent executing on the added message queueing node to a coordinating agent executing on a coordinating node of the system. The coordinating agent updates the configuration file of the coordinating node by adding the IP address and a node identity number of the added message queueing computing node to the configuration file. Message queueing agents executing on already running message queueing nodes and message processing agents executing on already running message processing nodes are registered to listen to the configuration file of the coordinating node. When these message queueing agents and message processing agents learn of the change in the configuration file of the coordinating node, they each update the configuration file of their own computing node.

The coordinating service monitors the state of the message queueing nodes and the message processing nodes. When the modifications of the configuration files of the message queueing nodes and the message processing nodes is detected, the coordinating agent restarts the services on each of these nodes. To avoid degradation of message handling services, the coordinating agent restarts only one service at a time, waiting for that service to restart and come on-line before restarting a different service on a different node. This process works much the same for addition of a message processing node as the process for adding a message queueing node described above.

When removing a node, the node may first be removed and then a human operator, such as a system administrator, may invoke an application programming interface (API) of the coordinating agent to inform it of the removed node, providing its IP address and node identity number. The coordinating agent may then change the configuration file accordingly, removing references to the removed nodes, the message queueing agents and the message processing agents listening on the changed configuration file may change the configuration files of their nodes, and the coordinating agent may restart services on the remaining nodes.

Turning now to FIG. 1, a system 100 is described. In an embodiment, system 100 comprises a plurality of message producers 102, a network 104, a plurality of message queueing nodes 106, a plurality of coordinating nodes 114, and a plurality of message processing nodes 122. The network 104 comprises one or more public communication networks, one or more private communication networks, or a combination thereof. Each message queueing node 106 comprises a message queueing service 108, a message queueing configuration file 110, and a message queueing agent 112. Each coordinating node 114 comprises a coordinating service 116, a coordinating configuration file 118, and a coordinating agent 120. Each message processing node 122 comprises a message processing service 124, a message processing configuration file 126, and a message processing agent 128. Each node 106, 114, 122 may be referred to as a computing node and is a computer system. Computer systems are described hereinafter. Each of the services 108, 116, 124 are provided by one or more applications or computer programs executing on a virtual machine or a plurality of virtual machines on its subject node.

Each of the services 108, 116, 124 learns of other services 108, 116, 124 and nodes 106, 114, 122 and collaborates with them based on a configuration file 110, 118, 126 local to the node 106, 114, 122 on which it executes. When the configuration file 110, 118, 126 on a node 106, 114, 122 is changed, the service 108, 116, 124 executing on the same node 106, 114, 122 may be restarted to undergo initialization based on the now changed configuration file 110, 118, 126, which in turn may alter its collaboration with other nodes 106, 114, 122 in the system 102. In an embodiment, the message queueing service 108 is implemented as a Kafka message queueing service or system. In an embodiment, the message processing service 124 is implemented using Storm. In an embodiment, the coordinating service 116 is implemented using Zookeeper.

The message producers 102 may be applications that execute on computer systems. The message producers 102 send messages relating events which have occurred on or related to mobile communication devices via the network 104 to the message queueing service 108 on the message queueing nodes 106 for storage while waiting for processing by message processing service 124 on the message processing nodes 122. The message producers 102 may receive events from tens of millions of mobile communication devices. The events may comprise signal quality data, cell site signal strength data, requests for a voice service link, requests for a data service link, a URL sent in an HTTP request, a position of the mobile communication device, a blocked call attempt, a dropped call, a hand-off record, and other events. A single mobile communication device may generate 100s or even 1000s of events per day, and these events from tens of millions of devices may be streamed by the message producers 102 into the message queueing service 108.

The message processing service 124 fetches messages enqueued by the message queueing service 108, with the help of the coordinating service 116, and does some processing on the mobile communication device event encapsulated in the fetched messages. This processing may include counting the events by category (e.g., number of dropped calls, number of blocked call attempts, number of successful calls), aggregating separate events into a single event (e.g., multiple events related to a single call combined in a single call record), storing events in storage or in a data store 130, placing the events in long term archival storage.

As the influx of messages from the message producers 102 increases or decreases, the number of computing nodes in the system 100 increases or decreases. When a node 106, 114, 122 is added or removed from the system 100, the on-going services 108, 116, 124 desirably are informed of the change and adapt to the change accordingly. In an embodiment, this is accomplished by first modifying the configuration file 110, 118, 126 and then restarting the service 108, 116, 124. Formerly the modification of configuration files 110, 118, 126 and the restarting of services 108, 116, 124 was handled manually. The present disclosure teaches a specific information technology solution for performing this activity automatically, whereby to reduce the burden on IT staffs, to reduce the opportunities for error, and to make the system 100 scale more rapidly.

When a new computing node is brought up and introduced into the system, the agent executing on that node informs a coordinating agent 120 executing on one of the coordinating nodes 114, for example sending a message to that coordinating agent 120 comprising the IP address and a node identity number of the newly added computing node. The coordinating agent 120 updates the coordinating configuration file 118 by adding the IP address and the node identity number of the new computing node. The other agents 112, 120, 128 are registered to listen to this coordinating configuration file 118, whereby any change in that file 118 is published to the agents 112, 120, 128. The agents 112, 120, 128 each adds the IP address and the node identity number to its associated configuration file 110, 118, 126. The coordinating service 116 monitors changes in the system 100 and hence the coordinating agent 120 knows when each computing node 106, 114, 122 has updated its configuration file 110, 118, 126. The coordinating agent 120 then restarts each of the services 108, 116, 124 on each node 106, 114, 122, after its associated configuration file 110, 118, 126 has been changed.

When a computing node is taken out of service, a technician, IT specialist, or system administrator invokes an interface of the coordinating agent 120 to inform it that the subject computing node is being taken out of service, identifying at least its node identity number to the coordinating agent 120. The coordinating agent 120 then removes the IP address and node identity of the computing node that is being taken out of service from the configuration file 118. The agents 112, 120, 128 each learns of this change and removes the IP address and node identity number from its associated configuration file 110, 118, 126. The coordinating service 116 monitors changes in the system 100 and hence the coordinating agent 120 knows when each computing node 106, 114, 122 has updated its configuration file 110, 118, 126. The coordinating agent 120 then restarts each of the services 108, 116, 124 on each node 106, 114, 122, after its associated configuration file 110, 118, 126 has been changed.

Figure 2A:
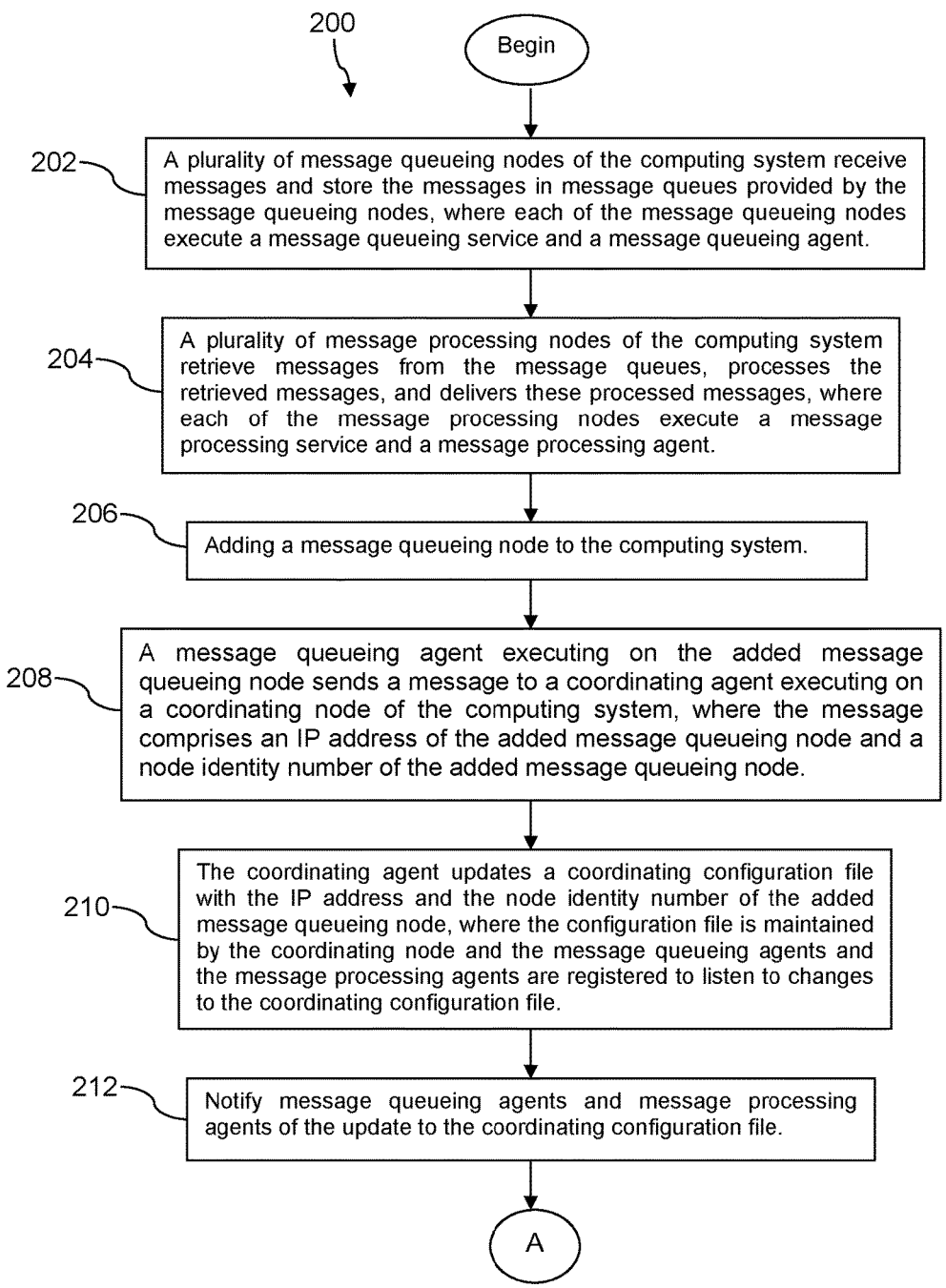
FIG. 2A and FIG. 2B are a flow chart of a method according to an embodiment of the disclosure.
Figure 2B:
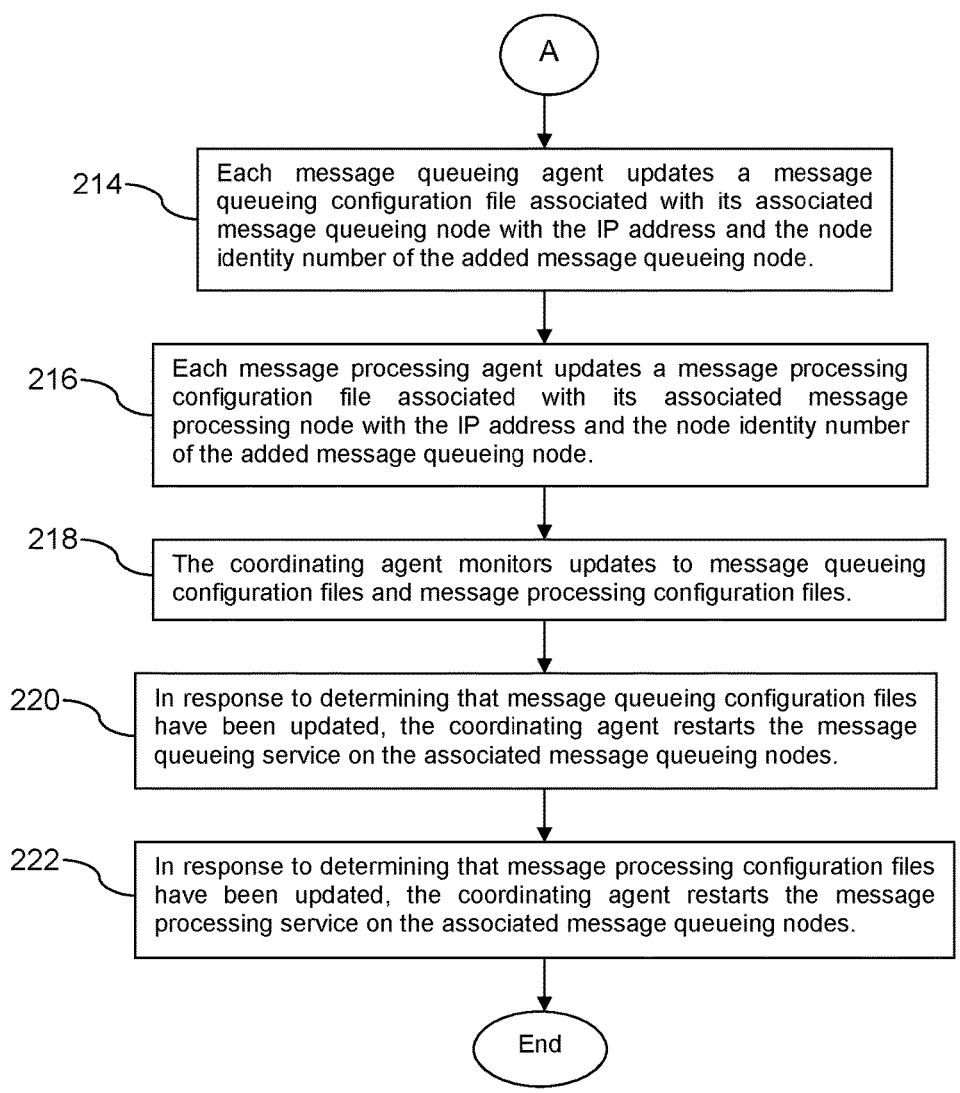

Turning now to FIG. 2A and FIG. 2B, a method 200 is described. At block 202, a plurality of message queueing nodes of the computing system receive messages and store the messages in message queues provided by the message queueing nodes, where each of the message queueing nodes execute a message queueing service and a message queueing agent. At block 204, a plurality of message processing nodes of the computing system retrieve messages from the message queues, processes the retrieved messages, and delivers these processed messages, where each of the message processing nodes execute a message processing service and a message processing agent. At block 206, add a message queueing node to the computing system.

At block 208, a message queueing agent executing on the added message queueing node sends a message to a coordinating agent executing on a coordinating node of the computing system, where the message comprises an IP address of the added message queueing node and a node identity number of the added message queueing node. At block 210, the coordinating agent updates a coordinating configuration file with the IP address and the node identity number of the added message queueing node, where the configuration file is maintained by the coordinating node and the message queueing agents and the message processing agents are registered to listen to changes to the coordinating configuration file. At block 212, notify message queueing agents and message processing agents of the update to the coordinating configuration file.

At block 214, each message queueing agent updates a message queueing configuration file associated with its associated message queueing node with the IP address and the node identity number of the added message queueing node. At block 216, each message processing agent updates a message processing configuration file associated with its associated message processing node with the IP address and the node identity number of the added message queueing node. At block 218, the coordinating agent monitors updates to message queueing configuration files and message processing configuration files. At block 220, in response to determining that message queueing configuration files have been updated, the coordinating agent restarts the message queueing service on the associated message queueing nodes. At block 222, in response to determining that message processing configuration files have been updated, the coordinating agent restarts the message processing service on the associated message queueing processing nodes. Coordinating agents of other coordinating nodes may update their configuration files accordingly. The coordinating agent may further restart coordinating service on others of the coordinating nodes than the one it itself is executing on.

Figure 3A:
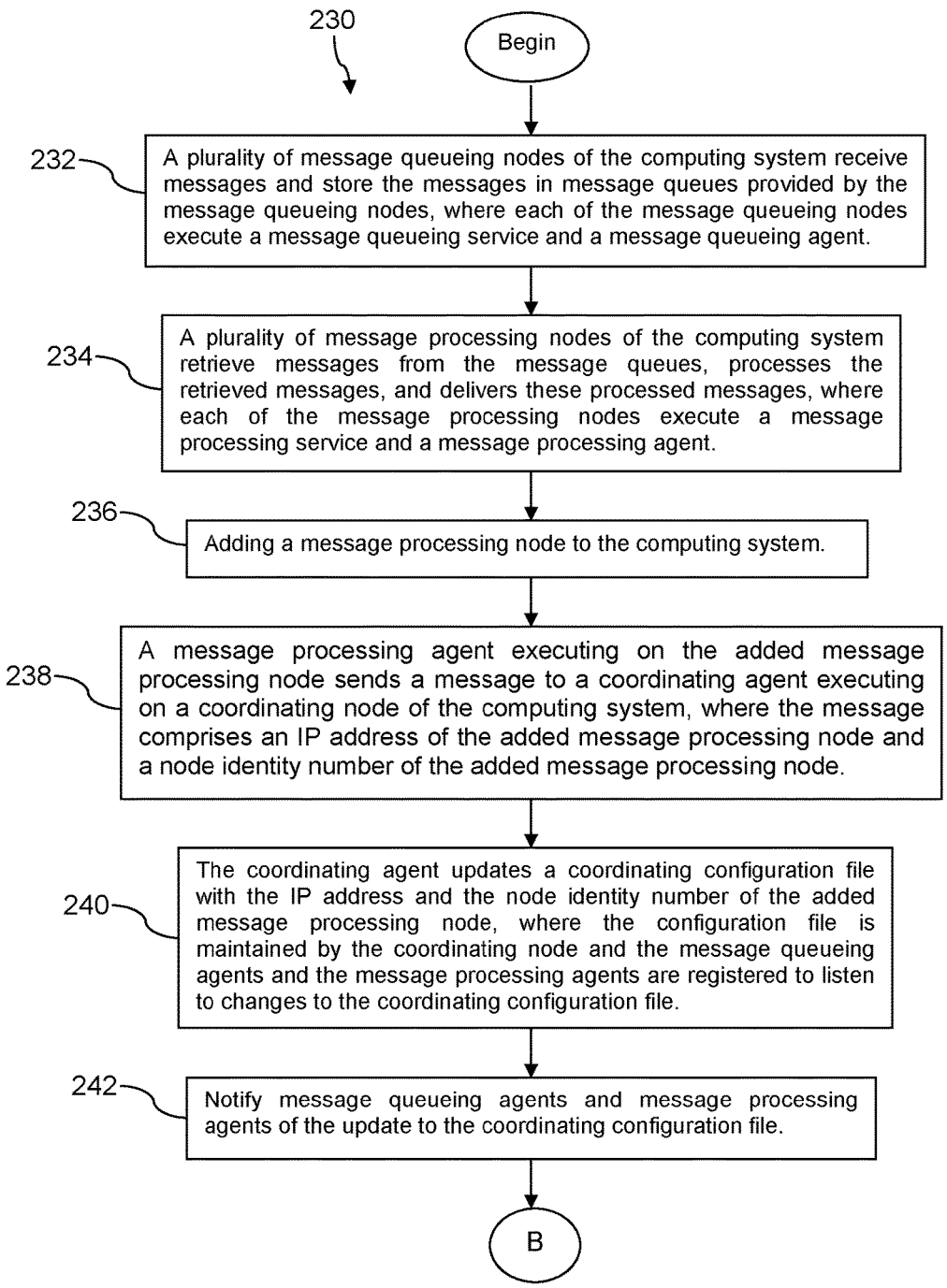
FIG. 3A and FIG. 3B are a flow chart of a method according to an embodiment of the disclosure.
Figure 3B:
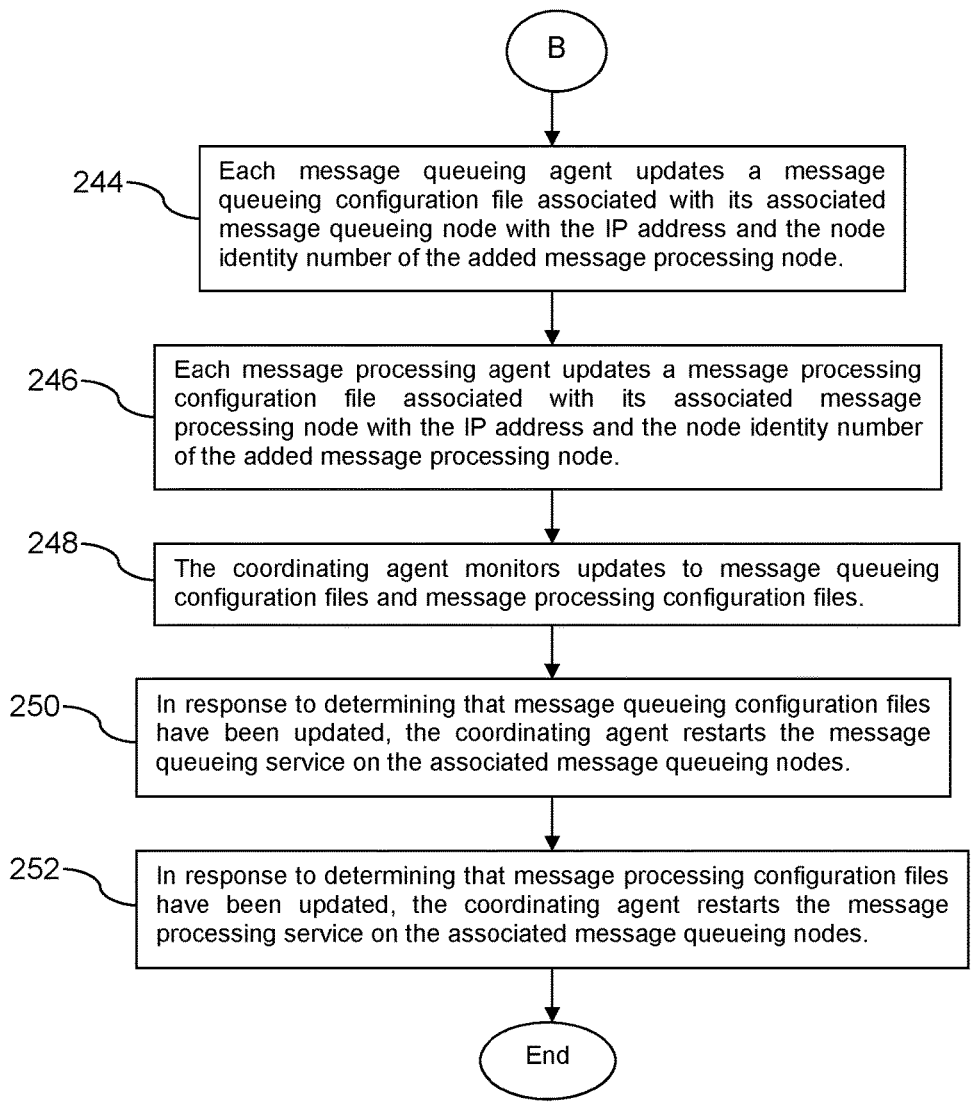

Turning now to FIG. 3A and FIG. 3B, a method 230 is described. At block 232, a plurality of message queueing nodes of the computing system receive messages and store the messages in message queues provided by the message queueing nodes, where each of the message queueing nodes execute a message queueing service and a message queueing agent. At block 234, a plurality of message processing nodes of the computing system retrieve messages from the message queues, processes the retrieved messages, and delivers these processed messages, where each of the message processing nodes execute a message processing service and a message processing agent. At block 236, add a message processing node to the computing system.

At block 238, a message processing agent executing on the added message processing node sends a message to a coordinating agent executing on a coordinating node of the computing system, where the message comprises an IP address of the added message processing node and a node identity number of the added message processing node. At block 240, the coordinating agent updates a coordinating configuration file with the IP address and the node identity number of the added message processing node, where the configuration file is maintained by the coordinating node and the message queueing agents and the message processing agents are registered to listen to changes to the coordinating configuration file. At block 242, notify message queueing agents and message processing agents of the update to the coordinating configuration file.

At block 244, each message queueing agent updates a message queueing configuration file associated with its associated message queueing node with the IP address and the node identity number of the added message processing node. At block 246, each message processing agent updates a message processing configuration file associated with its associated message processing node with the IP address and the node identity number of the added message processing node. At block 248, the coordinating agent monitors updates to message queueing configuration files and message processing configuration files. At block 250, in response to determining that message queueing configuration files have been updated, the coordinating agent restarts the message queueing service on the associated message queueing nodes.

At block 252, in response to determining that message processing configuration files have been updated, the coordinating agent restarts the message processing service on the associated message processing nodes. Coordinating agents of other coordinating nodes may update their configuration files accordingly. The coordinating agent may further restart coordinating service on others of the coordinating nodes than the one it itself is executing on.

Figure 4A:
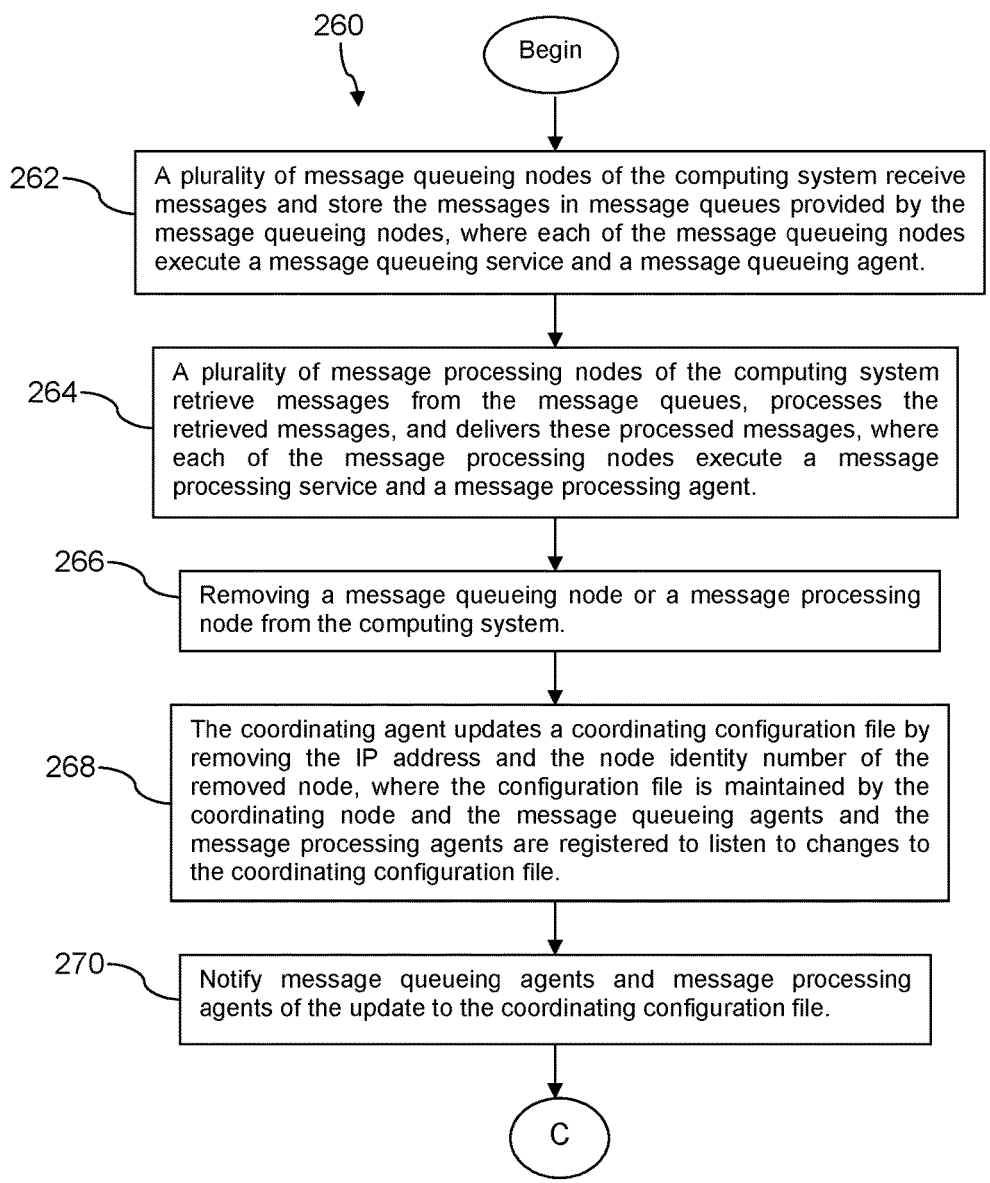
FIG. 4A and FIG. 4B are a flow chart of a method according to an embodiment of the disclosure.
Figure 4B:
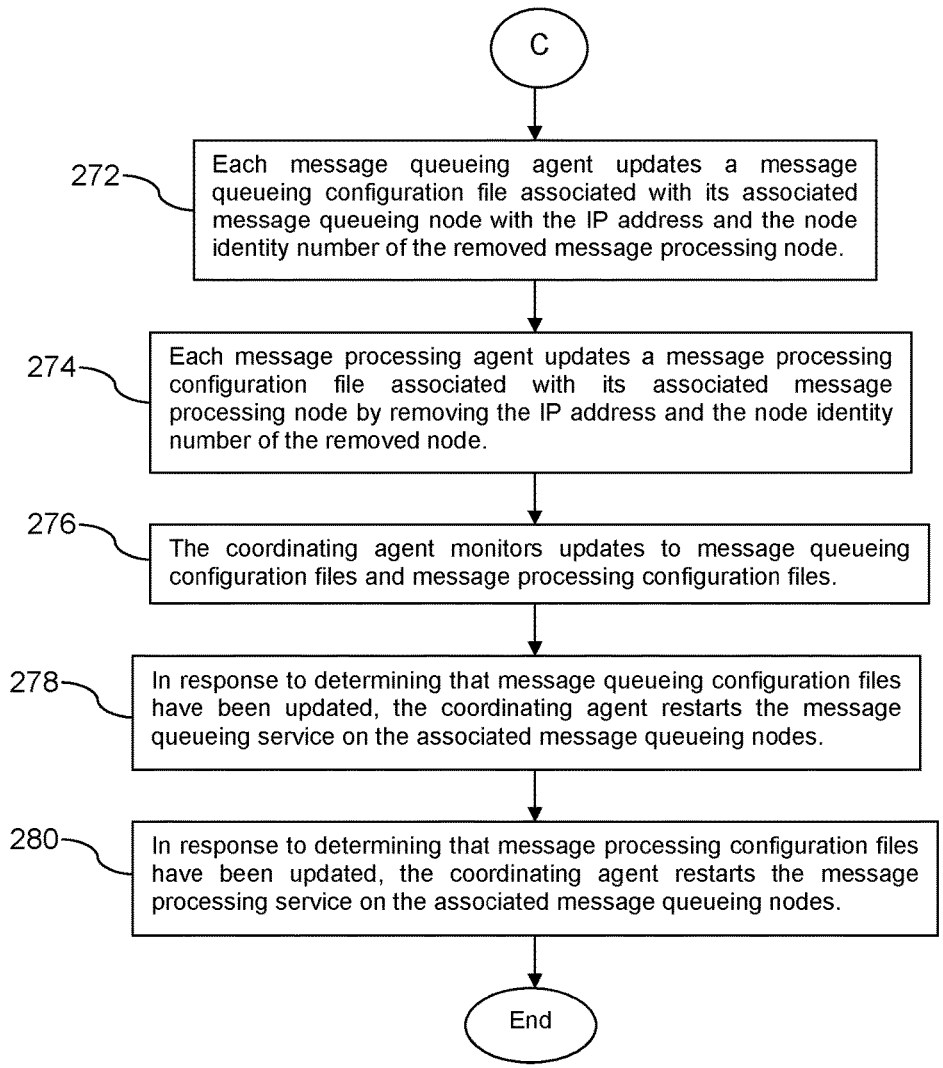

Turning now to FIG. 4A and FIG. 4B, a method 260 is described. At block 262, a plurality of message queueing nodes of the computing system receive messages and store the messages in message queues provided by the message queueing nodes, where each of the message queueing nodes execute a message queueing service and a message queueing agent. At block 264, a plurality of message processing nodes of the computing system retrieve messages from the message queues, processes the retrieved messages, and delivers these processed messages, where each of the message processing nodes execute a message processing service and a message processing agent. At block 266, removing a message queueing node to the computing system.

At block 268, the coordinating agent updates a coordinating configuration file with the IP address and the node identity number of the removed node, where the configuration file is maintained by the coordinating node and the message queueing agents and the message processing agents are registered to listen to changes to the coordinating configuration file. At block 270, notify message queueing agents and message processing agents of the update to the coordinating configuration file.

At block 272, each message queueing agent updates a message queueing configuration file associated with its associated message queueing node by removing the IP address and the node identity number of the removed node. At block 274, each message processing agent updates a message processing configuration file associated with its associated message processing node by removing the IP address and the node identity number of the removed node. At block 276, the coordinating agent monitors updates to message queueing configuration files and message processing configuration files. At block 278, in response to determining that message queueing configuration files have been updated, the coordinating agent restarts the message queueing service on the associated message queueing nodes. At block 280, in response to determining that message processing configuration files have been updated, the coordinating agent restarts the message processing service on the associated message queueing processing nodes. Coordinating agents of other coordinating nodes may update their configuration files accordingly. The coordinating agent may further restart coordinating service on others of the coordinating nodes than the one it itself is executing on.

Figure 5:
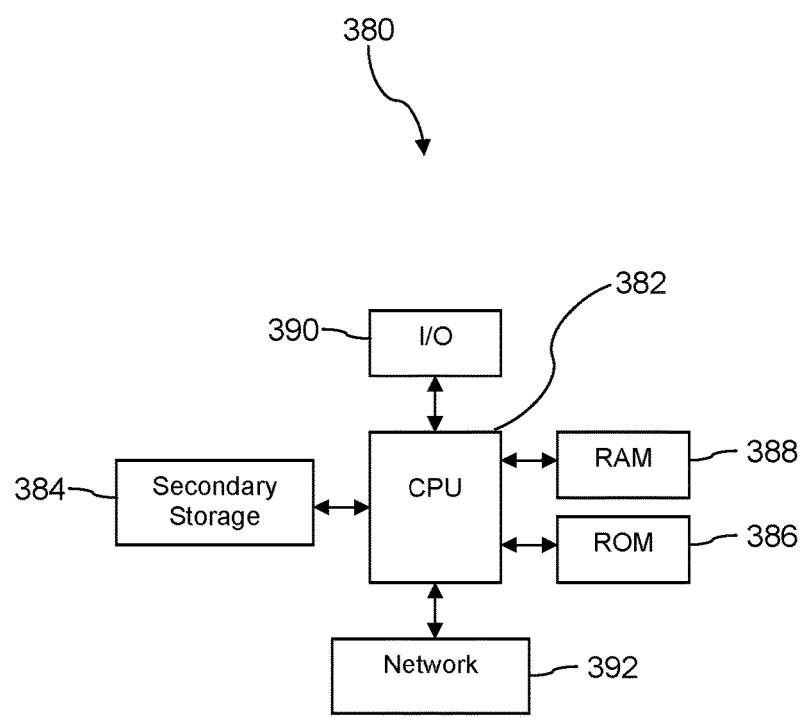
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing data messages in a computing system, comprising:
    receiving messages by a plurality of message queueing nodes of the computing system and storing the messages in message queues provided by the message queueing nodes, where each of the message queueing nodes execute a message queueing service and a message queueing agent, wherein the messages comprise information about events generated by mobile communication devices, and wherein the events comprise information about a blocked call attempt, a dropped call, a signal quality, and a cell site signal strength;
    retrieving messages from the message queues by a plurality of message processing nodes of the computing system, processing the retrieved messages, and delivering these processed messages, where each of the message processing nodes execute a message processing service and a message processing agent;
    adding a message queueing node to the computing system;
    sending a message from a message queueing agent executing on the added message queueing node to a coordinating agent executing on a coordinating node of the computing system, where the message comprises an IP address of the added message queueing node and a node identity number of the added message queueing node;
    updating a coordinating configuration file with the IP address and the node identity number of the added message queueing node by the coordinating agent, where the configuration file is maintained by the coordinating node and the message queueing agents of the message queueing nodes and the message processing agents of the message processing nodes are registered to listen to changes to the coordinating configuration file of the coordinating node;
    notifying the message queueing agents and the message processing agents of the update to the coordinating configuration file based on the message queueing agents and the message processing agents being registered to listen to changes to the coordinating configuration file;
    updating by each message queueing agent a message queueing configuration file associated with its associated message queueing node with the IP address and the node identity number of the added message queueing node;
    updating by each message processing agent a message processing configuration file associated with its associated message processing node with the IP address and the node identity number of the added message queueing node;
    monitoring updates to message queueing configuration files and message processing configuration files by the coordinating agent;
    in response to determining that message queueing configuration files have been updated, restarting the message queueing service on the associated message queueing nodes by the coordinating agent; and
    in response to determining that message processing configuration files have been updated, restarting the message processing service on the associated message processing nodes by the coordinating agent.

2. The method of claim 1, wherein processing the retrieved messages by the message processing nodes comprises generating counts, aggregating separate events into a single event, and storing events.

3. The method of claim 1, wherein the messaging queueing nodes execute a Kafka message queueing service.

4. The method of claim 1, wherein the message processing nodes execute a Storm processing service.

5. The method of claim 1, wherein the coordinating nodes execute a Zookeeper service.

6. A method of processing data messages in a computing system, comprising:
    receiving messages by a plurality of message queueing nodes of the computing system and storing the messages in message queues provided by the message queueing nodes, where each of the message queueing nodes execute a message queueing service and a message queueing agent, wherein the messages comprise information about events generated by mobile communication devices, and wherein the events comprise information about a blocked call attempt, a dropped call, a signal quality, and a cell site signal strength;
    retrieving messages from the message queues by a plurality of message processing nodes of the computing system, processing the retrieved messages, and delivering these processed messages, where each of the message processing nodes execute a message processing service and a message processing agent;
    adding a message processing node to the computing system;
    sending a message from a message processing agent executing on the added message processing node to a coordinating agent executing on a coordinating node of the computing system, where the message comprises an IP address of the added message processing node and a node identity number of the added message processing node;
    updating a coordinating configuration file with the IP address and the node identity number of the added message processing node by the coordinating agent, where the configuration file is maintained by the coordinating node and the message queueing agents of the message queueing nodes and the message processing agents of the message processing nodes are registered to listen to changes to the coordinating configuration file of the coordinating node;

notifying the message queueing agents and the message processing agents of the update to the coordinating configuration file based on the message queueing agents and the message processing agents being registered to listen to changes to the coordinating configuration file;

updating by each message queueing agent a message queueing configuration file associated with its associated message queueing node with the IP address and the node identity number of the added message processing node;

updating by each message processing agent a message processing configuration file associated with its associated message processing node with the IP address and the node identity number of the added message processing node;

monitoring updates to message queueing configuration files and message processing configuration files by the coordinating agent;

in response to determining that message queueing configuration files have been updated, restarting the message queueing service on the associated message queueing nodes by the coordinating agent; and in response to determining that message processing configuration files have been updated, restarting the message processing service on the associated message processing nodes by the coordinating agent.

7. The method of claim 6, wherein processing the retrieved messages by the message processing nodes comprises generating counts, aggregating separate events into a single event, and storing events.

8. The method of claim 6, wherein the messaging queueing nodes execute a Kafka message queueing service.

9. The method of claim 6, wherein the message processing nodes execute a Storm processing service.

10. The method of claim 6, wherein the coordinating nodes execute a Zookeeper service.

11. A method of processing data messages in a computing system, comprising:

receiving messages by a plurality of message queueing nodes of the computing system and storing the messages in message queues provided by the message queueing nodes, where each of the message queueing nodes execute a message queueing service and a message queueing agent, wherein the messages comprise information about events generated by mobile communication devices, and wherein the events comprise information about a blocked call attempt, a dropped call, a signal quality, and a cell site signal strength;

retrieving messages from the message queues by a plurality of message processing nodes of the computing system, processing the retrieved messages, and delivering these processed messages, where each of the message processing nodes execute a message processing service and a message processing agent;

removing a message queueing node or a message processing node from the computing system;

updating a coordinating configuration file by removing the IP address and the node identity number of the removed node by the coordinating agent, where the configuration file is maintained by the coordinating node and the message queueing agents of the message queueing nodes and the message processing agents of the message processing nodes are registered to listen to changes to the coordinating configuration file of the coordinating node;

notifying the message queueing agents and the message processing agents of the update to the coordinating configuration file based on the message queueing agents and the message processing agents being registered to listen to changes to the coordinating configuration file;

updating by each message queueing agent a message queueing configuration file associated with its associated message queueing node by removing the IP address and the node identity number of the removed node from the message queueing configuration file;

updating by each message processing agent a message processing configuration file associated with its associated message processing node by removing the IP address and the node identity number of the removed node from the message processing configuration file;

monitoring updates to message queueing configuration files and message processing configuration files by the coordinating agent;

in response to determining that message queueing configuration files have been updated, restarting the message queueing service on the associated message queueing nodes by the coordinating agent; and in response to determining that message processing configuration files have been updated, restarting the message processing service on the associated message processing nodes by the coordinating agent.

12. The method of claim 11, wherein processing the retrieved messages by the message processing nodes comprises generating counts, aggregating separate events into a single event, and storing events.

13. The method of claim 11, wherein the messaging queueing nodes execute a Kafka message queueing service.

14. The method of claim 11, wherein the message processing nodes execute a Storm processing service.

* * * * *